United States Patent
Romet et al.

(10) Patent No.: US 10,854,895 B2
(45) Date of Patent: Dec. 1, 2020

(54) THERMAL REGULATION SYSTEM FOR A FUEL CELL

(71) Applicant: SAFRAN POWER UNITS, Toulouse (FR)

(72) Inventors: Antoine Romet, Moissy-Cramayel (FR); Serge Le Gonidec, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 88 days.

(21) Appl. No.: 16/303,014

(22) PCT Filed: May 17, 2017

(86) PCT No.: PCT/FR2017/051191
§ 371 (c)(1),
(2) Date: Nov. 19, 2018

(87) PCT Pub. No.: WO2017/198948
PCT Pub. Date: Nov. 23, 2017

(65) Prior Publication Data
US 2019/0288303 A1 Sep. 19, 2019

(30) Foreign Application Priority Data
May 20, 2016 (FR) ..................................... 16 54506

(51) Int. Cl.
*H01M 8/04007* (2016.01)
*H01M 8/04029* (2016.01)
(Continued)

(52) U.S. Cl.
CPC ... *H01M 8/04029* (2013.01); *H01M 8/04007* (2013.01); *H01M 8/0432* (2013.01); *H01M 8/04768* (2013.01)

(58) Field of Classification Search
CPC ...................... H01M 8/04007; H01M 8/04029
See application file for complete search history.

(56) References Cited

U.S. PATENT DOCUMENTS 4,342,200 A * 8/1982 Lowi, Jr. ............ B60H 1/00007
62/191
4,362,789 A 12/1982 Dighe
(Continued)

FOREIGN PATENT DOCUMENTS

| FR | 2 935 475 A1 | 3/2010 |
|---|---|---|
| KR | 2016 0020670 A | 2/2016 |
| WO | 2015040270 A1 | 3/2015 |

OTHER PUBLICATIONS

International Search Report dated Jul. 25, 2017, in International Application No. PCT/FR2017/051191, and English translation (7 pages).

*Primary Examiner* — Olatunji A Godo
(74) *Attorney, Agent, or Firm* — Bookoff McAndrews, PLLC

(57) ABSTRACT

A thermal regulator system (10) for a fuel cell (12), the system comprising a passive pump member (14) having a first inlet (14a) connected to a first pipe (16), a second inlet (14b) connected to a second pipe (18), and an outlet (14c) configured to be connected to a cooling circuit (20) of the fuel cell (12), the passive pump member (14) being configured to use the Venturi effect to drive a fluid flow along the second pipe (18) by means of a fluid flowing along the first pipe (16). The first pipe (16) and the second pipe (18) are configured to be connected to an outlet of the cooling circuit (20) of the fuel cell (12), the first pipe (16) and the second pipe (18) being configured to feed the passive pump member (14) with fluids at different temperatures.

17 Claims, 1 Drawing Sheet

(51) Int. Cl.
*H01M 8/0432* (2016.01)
*H01M 8/04746* (2016.01)

(56) References Cited

U.S. PATENT DOCUMENTS 5,441,821 A     8/1995   Merritt et al.
2011/0300457 A1* 12/2011  Kuehn .............. H01M 8/04007
                                             429/410

* cited by examiner

THERMAL REGULATION SYSTEM FOR A FUEL CELL

CROSS-REFERENCE TO RELATED APPLICATIONS

This application is the U.S. national phase entry under 35 U.S.C. § 371 of International Application No. PCT/FR2017/051191, filed on May 17, 2017, which claims priority to French Patent Application No. 1654506, filed on May 20, 2016, the entireties of which are herein incorporated by reference.

FIELD OF THE INVENTION

The present disclosure relates to the field of thermal regulation, and more particularly to a thermal regulation system for a fuel cell. The term "thermal regulation" is used in general manner to cover heating, cooling, and/or adjusting a temperature to match a setpoint temperature.

TECHNOLOGICAL BACKGROUND

A fuel cell, also referred to below as "FC", comprises a stack of one or more cells, each cell causing an oxidizer and a reducing agent to react together to generate electricity.

A fuel cell generally has electrical efficiency that is considered as poor compared with the efficiency obtained from other power sources. This efficiency is typically about 50%, with the remainder being dissipated in the form of heat. It is therefore important to maximize this efficiency by causing the fuel cell to run at an optimum temperature. Furthermore, with certain fuel cells, operating below a certain temperature degrades the individual cells irreparably.

It is therefore necessary to be able to keep the fuel cell at its optimum operating temperature. This can require the fuel cell to be heated before it is started or the fuel cell to be cooled while it is in operation in order to discharge the heat power produced that is not converted into electrical power.

Various thermal regulation systems have been designed. Nevertheless, when a fuel cell is in an environment such as a space aircraft, such systems are penalizing in terms of reliability and weight.

There therefore exists a need for a novel type of fuel cell.

SUMMARY OF THE INVENTION

To this end, the present disclosure provides a thermal regulator system for a fuel cell, the system comprising a passive pump member having a first inlet connected to a first pipe, a second inlet connected to a second pipe, and an outlet configured to be connected to a cooling circuit of the fuel cell, the passive pump member being configured to use the Venturi effect to drive a fluid flowing along the second pipe by means of a fluid flowing along the first pipe, the first pipe and the second pipe being configured to be connected to an outlet of the cooling circuit of the fuel cell, the first pipe being provided with a heat exchanger so that the first pipe and the second pipe are configured to feed the passive pump member with fluids at different temperatures.

The term "passive pump member" is used to mean a member within which the pumping of the fluid is not caused by the movement of a part that transmits mechanical energy to the liquid, or at least not in full. Thus, the passive pump member need not have any piston, gears, blades, compressor, or the like. In contrast, an active pump member may be a conventional pump or compressor.

The Venturi effect is an effect that is itself well known, whereby a fluid flowing through a converging portion of a tube is subjected to an increase in speed with a decrease in pressure. The resulting suction can be used for inducing a fluid flow, specifically inducing the flow of a second fluid. The fluid entering into the passive pump member via the first pipe is referred to as the driving fluid (or "motive flow"), since that is the fluid which is accelerated so as to drive the induced flow. The fluid entering into the passive pump member via the second pipe is referred to as the entrained fluid (or "suction flow"), since this flow is induced by the pressure drop in the driving fluid. After the entrained fluid flow has been induced, the entrained fluid and the driving fluid mix together within and/or at the outlet of the passive pump member.

The cooling circuit of the FC, also referred to as a thermal circuit, is a circuit that is generally situated inside the stack of cells and that serves to enable a heat transfer fluid, generally oil, to flow in order to maintain the stack at a desired temperature.

In the meaning of the present disclosure, the term "heat exchanger" is used to designate any device that enables heat to be exchanged with an external element. For example, the first pipe may be provided with a heat exchanger and fan unit, referred to as "a unit heater", with a fan, or with cooling fins, or it may be of a shape that enhances the dissipation of heat. Preferably, the heat exchanger is configured so that the temperature of the fluid from the first pipe is lower than the temperature of the fluid from the second pipe.

Thus, the fluid flowing through the first pipe and entering the passive pump member has a temperature that is different from the temperature of the fluid flowing through the second pipe. Mixing between these fluids at different temperatures within the passive pump member provides thermal regulation for the FC.

The regulator system as described makes use of a passive pump member having as few moving parts as possible. Consequently, the total weight and the cost of the regulator system are reduced. Furthermore, the passive pump member is less sensitive than a conventional pump to temperature stresses associated with the temperature of the cooling liquid, which is typically about 200° C., or to wear due to the movement of mechanical parts. Consequently, the reliability and the lifetime of the thermal regulator system are increased.

In some embodiments, the thermal regulator system further comprises a buffer tank configured to be connected to said outlet of the cooling circuit of the fuel cell, the first pipe and the second pipe being connected to the buffer tank.

Thus, in operation, the outlet of the cooling circuit of the fuel cell is connected to the buffer tank, and then the first and second pipes extend between the buffer tank and the passive pump member. The buffer tank serves both to ensure that the temperatures at the inlets of the first and second pipes are uniform and also to damp variations of flow rate through the thermal regulator system.

In some embodiments, the passive pump member is an ejector. The ejector has a main branch with a converging portion so as to cause the driving fluid to accelerate. A secondary branch is connected to the converging portion so that the driving fluid, by accelerating and by dropping in pressure as a result of the Venturi effect, induces a flow of the entrained fluid that enters via the secondary branch. The term "throat section" is used to designate the smallest section of the ejector through which the driving fluid flows.

The throat section determines the flow rate of the driving fluid and also the ratio of the driving fluid flow rate over the entrained fluid flow rate.

In some ejectors referred to as "variable geometry" ejectors, that are themselves known, the throat section is variable and can be adjusted in order to control this ratio.

In some embodiments, the thermal regulator includes a control unit for controlling the throat section of the ejector. Thus, as explained above, the control unit serves to adjust the ratio between the flow rate of the driving fluid and the flow rate of the entrained fluid. Since these two fluids are at different temperatures, controlling the ratio between these two flow rates serves to modulate the temperature of the mixture of these two fluids. Thus, the temperature at which the heat transfer fluid enters the cooling circuit of the fuel cell can be adjusted.

In some embodiments, the thermal regulator system further comprises a pump placed on the first pipe. The pump serves to increase the pressure in the first pipe, i.e. to increase the pressure of the driving fluid before it enters into the passive pump member, thereby increasing the efficiency of the passive pump member. Preferably, in order to limit the thermal stress on the pump, the first pipe is used to convey a fluid flow that is colder than that in the second pipe. The pump is preferably situated between the heat exchanger and the passive pump member.

In some embodiments, the thermal regulator system includes a control unit for controlling the flow rate of the pump. The unit for controlling the flow rate of the pump may be the same unit as the unit for controlling the throat section of the ejector or it may be a different unit, as appropriate.

Increasing the flow rate of the driving fluid flowing through the first pipe makes it possible in the passive pump member to induce a greater flow of the entrained fluid, whereby the flow rate leaving the passive pump member and entering the cooling circuit of the fuel cell is also increased. As a result, controlling the flow rate of the pump serves to adjust the temperature of the fuel cell.

In some embodiments, the thermal regulator system includes a measurement device for measuring a magnitude that is representative of the thermal power given by the fuel cell, in particular by its stack of cells. A magnitude representative of the thermal power given off by the fuel cell may be any magnitude from which it is possible to deduce the thermal power given off by the fuel cell, typically the electrical power delivered by the fuel cell. Knowing the thermal power given off by the fuel cell makes it possible to anticipate how its temperature will vary and to anticipate variation in the temperature gradient within the fuel cell.

In some embodiments, the control unit is configured to control the throat section of the ejector and/or the flow rate of the pump as a function of a temperature and/or of the temperature difference of the fluid between the inlet and the outlet of the fuel cell.

The temperature difference between the fuel cell and a setpoint temperature shows how the throat section and/or the flow rate of the pump need to be controlled in order to bring the temperature of the fuel cell as close as possible to the setpoint temperature, possibly within a certain margin. This ensures optimum operation of the fuel cell. Furthermore, the temperature difference of the fluid between the inlet and the outlet of the fuel cell serves to control the temperature differences to which the stack of cells is subjected. The inlet and outlet of the cooling circuit may be taken respectively as being the inlet and the outlet of the fuel cell. The temperature and the temperature difference of the fluid between the inlet and the outlet of the fuel cell thus constitute respective physical magnitudes that are particularly useful and effective for indicating whether or not the fuel cell is at a desired temperature and how it should be regulated, i.e. how the throat section and/or the flow rate of the pump should be modified.

Furthermore, as mentioned above, the throat section and the flow rate of the pump are two adjustment variables that enable the cooling of the fuel cell to be controlled. Thus, controlling one and/or the other of these two variables makes it possible to act on the thermal regulation of the fuel cell.

The present disclosure also provides a method of thermal regulation, typically for a fuel cell, the method comprising:
obtaining a temperature of the fuel cell;
obtaining a temperature difference of the fluid between the inlet and outlet of the cooling circuit; and
controlling the throat section of the ejector and/or the flow rate of the pump as a function of the setpoint temperature and as a function of said magnitude(s).

BRIEF DESCRIPTION OF THE DRAWING

The invention and its advantages can be better understood on reading the following detailed description of embodiments of the invention given as non-limiting examples. The description refers to the accompanying drawing, in which.

DETAILED DESCRIPTION OF THE INVENTION

Figure 1:
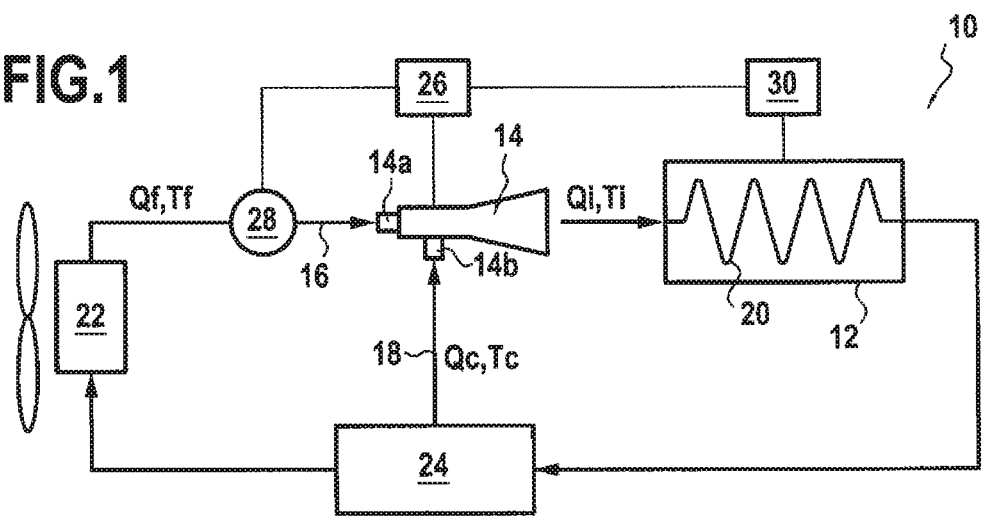
FIG. 1 is a diagram of an embodiment of the regulator system for a fuel cell.

FIG. 1 shows a thermal regulator system 10 (referred to below as the "system 10") for a stack of cells 12 of a fuel cell. By misuse of language and without loss of generality, reference is also made to thermal regulation of the fuel cell 12; below, the temperature of the fuel cell 12 designates the temperature of its stack of cells. The fuel cell 12 includes a cooling circuit 20, located in this example inside said stack. The inlet and the outlet of the fuel cell 12 designate respectively those portions of the cooling circuit 20 that are at the inlet and those that are at the outlet of the stack. By conveying a flow of a heat transfer fluid, the cooling circuit 20 serves to heat or to cool the stack so as to maintain it at a desired temperature (setpoint temperature), e.g. so as to enable it to start or so as to optimize its efficiency. The setpoint temperature may be about 200° C.

In this embodiment, the heat transfer fluid is oil. The oil may be of the Calflo (registered trademark) type, typically an oil that remains in the liquid state at relatively low pressures (2 bar to 3 bar at about 200° C.) and with a flash point that is relatively high, typically higher than 200° C. or even higher than 220° C. The person skilled in the art has the skills to select any other heat transfer fluid that is appropriate for ensuring a certain safety margin between the flash point of said fluid and the maximum operating temperature of the fuel cell.

As mentioned above, the system 10 has a passive pump member 14. The passive pump member 14 has a first inlet 14a connected to a first pipe 16, a second inlet 14b connected to a second pipe 18, and an outlet 14c configured to be connected to the cooling circuit 20 of the fuel cell 12. The passive pump member 14 is fed with heat transfer fluid coming from the first pipe 16 at a flow rate Qf and at a temperature Tf. The passive pump member 14 is also fed with heat transfer fluid coming from the second pipe 18, at a flow rate Qc and at a temperature Tc. These two fluids are mixed together and the fluid at the outlet from the passive pump member 14 has a flow rate Qi and a temperature Ti.

As described in detail below, the passive pump member 14 is configured to use the Venturi effect to drive a fluid flowing in the second pipe 18 by using a fluid flowing in the first pipe 16.

The first pipe 16 has a heat exchanger 22. Specifically, the heat exchanger 22 is a unit heater, i.e. an apparatus comprising a part for exchanging heat by conduction and associated with a fan. The heat is transmitted from the fluid to the outside via the heat exchanger part by conduction, and the fan improves the discharge of said heat by forced convection. Nevertheless, any other heat exchanger could be used.

Thus, the first pipe 16 and the second pipe 18 are configured to feed the passive pump member 14 with fluid at different temperatures. Specifically, the temperature of the fluid flowing in the first pipe 16, downstream from the unit heater 22, is lower than the temperature of the fluid flowing in the second pipe 18. The discharge of heat from a portion of the heat transfer fluid is effective when the thermal regulator system is used for cooling the fuel cell 12. Conversely, when the fuel cell is to be heated, typically prior to being started, the heat exchanger 22 can be used for heating the fluid flowing in the first pipe 16. Optionally, a heater resistor may be added to the heat exchanger.

Furthermore, the first pipe 16 and the second pipe 18 are configured to be connected to an outlet of the cooling circuit 20 of the fuel cell 12. Specifically, the thermal regulator system 10 includes a buffer tank 24. The buffer tank 24 is connected to the outlet of the cooling circuit 20 of the fuel cell 12. As shown in FIG. 1, the first pipe 16 and the second pipe 18 are connected to the buffer tank 24.

Furthermore, the thermal regulator system includes a pump 28. In this embodiment, the pump 28 may be placed on the first pipe, preferably between the heat exchanger 22 and the passive pump member 14. Thus, in the light of the above, it can be understood that the pump 28 is placed on the portion of pipe through which the heat transfer fluid flows at its lowest temperature. Thus, the pump 28 is subjected as little as possible to thermal stresses.

Unlike the passive pump member 14, the pump 28 may be an active pump in which mechanical energy is transmitted in full to the fluid by mechanical moving parts, ignoring thermal losses. The pump 28 may be a booster pump or any other element for feeding a fluid.

Figure 2:
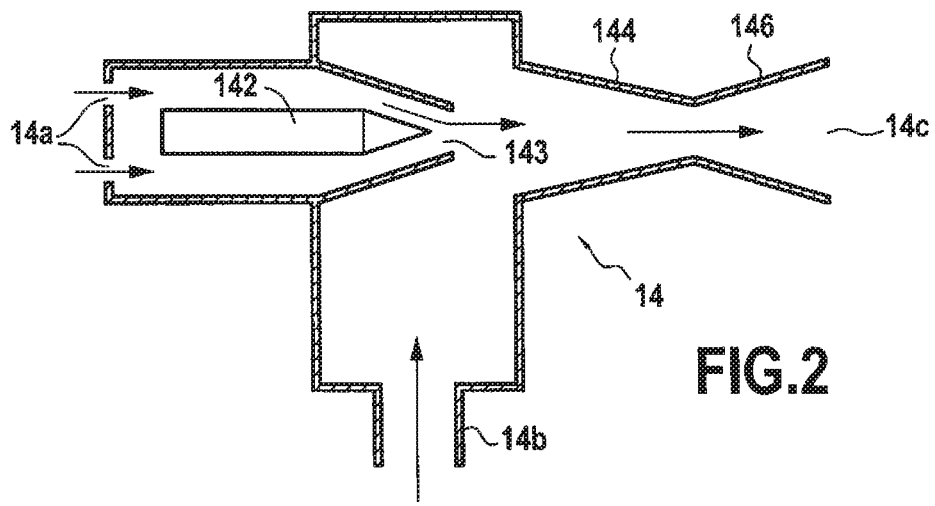
FIG. 2 shows the operating principle of an ejector in an embodiment.

In the present embodiment, the passive pump member 14 is an ejector (referred to below as the "ejector 14"). Such an ejector is shown diagrammatically in greater detail in FIG. 2.

The ejector 14 includes a throat 143 through which the fluid arriving via the first inlet 14a, specifically the driving fluid, is injected. Downstream from the throat 143, the driving fluid is subjected to a pressure drop in the converging portion 144, thereby sucking in the entrained fluid, which arrives via the second inlet 14b. The two fluids are mixed together and their speed is reduced in the diverging portion 146 that is connected downstream from the converging portion 144.

Specifically, the ejector 14 is an ejector of the variable geometry type. The flow section of the throat 143, also referred to as the "throat section", of the ejector 14 can be increased or decreased, specifically depending on the axial position of a rod 142. The means for controlling the position of the rod 142, e.g. electrical means, are not shown. It is thus possible to modulate the ratio between the flow rate of the driving fluid through the ejector and the flow rate of the fluid induced through the ejector. The greater the extent to which the throat 143 is closed, the smaller the section of the throat, and the greater the suction downstream from the throat so the greater the amount of fluid that is entrained for a given flow rate of driving fluid.

Variable geometry ejectors and means for controlling them are themselves known. Variable geometry ejectors of types other than the ejector 14 could be used.

In the present embodiment, the entire ejector 14 may be made of plastics material, with the exception of the throat, which may be made of metal material. Thus, the ejector 14 is particularly lightweight, which makes it very well adapted to being used on board an aerospace vehicle.

Figure 3:
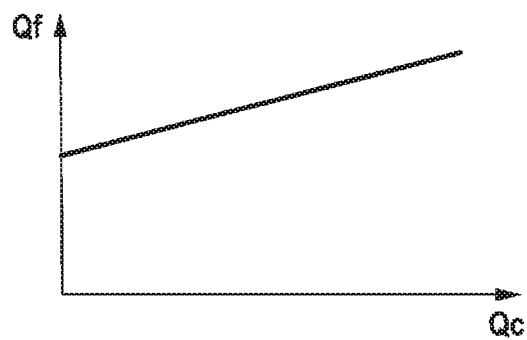
FIG. 3 plots a characteristic curve for an ejector in an embodiment.

FIG. 3 plots a characteristic curve for the ejector 14 where the flow rate of the driving fluid Qf is plotted as a function of the flow rate of the entrained fluid Qc in the operating range of the ejector 14. As can be seen, the flow rate of the entrained fluid Qc is an increasing affine function of the flow rate of the driving fluid Qf. Modifying the throat section of the ejector 14 amounts to modifying the slope of the line in FIG. 3.

With reference once more to FIG. 1, the thermal regulator system 10 includes an electronic control unit 26. In this embodiment, the electronic control unit 26 is configured to control both the throat section of the ejector 14 and the flow rate of the pump 28. Nevertheless, these parameters could be controlled by distinct control units.

The thermal regulator system 10 also includes a measurement device 30 for measuring a magnitude representative of the thermal power given off by the fuel cell 12, in particular by its stack of cells. In the present embodiment, this representative magnitude is the electrical power delivered by the FC, and the measurement device 30 is an electrical sensor, typically a wattmeter. By knowing the delivered electrical power and having a table of the efficiency of the fuel cell, it is possible to determine the thermal power given off by the fuel cell.

In this example, the electronic control unit 26 has the hardware architecture of a computer. In particular, it may comprise a processor, a read only memory (ROM), a random access memory (RAM), a non-volatile memory, and communication means for communicating with the measurement device 30 so as to enable the electronic control unit 26 to obtain the measurements taken by the measurement device 30. By way of example, the electronic control unit 26 and the measurement device 30 may be connected together by a digital database or by a serial interface (e.g. a universal serial bus (USB) interface) or a wireless interface, which are known per se.

By determining firstly a thermal balance for the fuel cell associating the temperature of the heat transfer fluid in the fuel cell with thermal power, and secondly an enthalpy balance within the ejector, the inventors have shown that the flow rate Qf in the first pipe 16 can be expressed as a function of the throat section of the ejector 14, of the thermal power given off by the fuel cell 12, of the temperature of the fuel cell 12, and of parameters of the system 10 (first relationship). The thermal power is considered to be a disturbance insofar as it is itself set by the electrical power taken from the fuel cell 12, which electrical power is determined by operational requirements.

Furthermore, in order to preserve the technical characteristics of the fuel cell, the temperature difference to which the stack of cells is subjected must remain below a certain limit, e.g. 20° C. This requires the flow rate Qf in the first pipe 16 to be greater than some minimum flow rate, which it can be shown depends on the thermal power given off by the fuel cell 12 and on the throat section (second relationship). This minimum flow rate corresponds to a maximum acceptable value for the temperature difference of the heat transfer fluid between the inlet and the outlet of the fuel cell 12.

Since the thermal power given off by the fuel cell 12 is considered to be a given, it follows that the throat section and the flow rate of the pump 28 are adjustment variables that can be used with the above-mentioned first and second relationships to adjust the temperature of the fuel cell 12 and the temperature difference in the heat transfer fluid between the inlet and the outlet of the fuel cell 12.

In order to estimate the temperature of the stack for the purpose of comparing with a setpoint temperature, it is possible to take the arithmetic mean of the temperatures of the heat transfer fluid at the inlet and at the outlet of the stack. Said temperatures of the fluid can be measured by sensors connected to the measurement device 30.

In order to estimate the temperature difference of the heat transfer fluid between the inlet and the outlet of the stack, it suffices to subtract one of these values from the other. Thus, the sensors used for estimating the temperature of the stack 12 and for estimating the temperature difference of the heat transfer fluid are advantageously the same sensors.

The setpoint temperature and/or the maximum acceptable temperature difference for the heat transfer fluid between the inlet and the outlet of the cooling circuit 20 can be given as inputs to the control unit 26. In this way, the control unit 26 is configured to control the throat section of the ejector 14 and/or the flow rate of the pump 28 as a function of the temperature of the fuel cell, or more precisely the temperature difference between the fuel cell 12 and the setpoint temperature, and/or the temperature difference of the heat transfer fluid between the inlet and the outlet of the fuel cell 12.

In certain embodiments, this control is performed in multivariable manner. In such embodiments, the electronic control unit 26 has a multivariable law taking as inputs the temperature of the fuel cell 12 and the temperature difference of the heat transfer fluid between the inlet and the outlet of the stack, and returning as output a signal for controlling the throat section of the ejector 14 and a signal for controlling the flow rate of the pump 28. The multivariable law may be in the form of a transfer matrix between these four variables.

Nevertheless, the presence of an inequality between the two above-mentioned relationships makes it possible to process the two control variables, namely the flow rate and the throat section, sequentially, and thus in single-variable manner. For example, temperature changes may be compensated by adjusting the flow rate Qf of the pump 28 in compliance with the first relationship. This first compensation may be performed in a closed loop, i.e. with the flow rate being servo-controlled on the estimated temperature difference relative to the setpoint temperature. Furthermore, it is ensured that the temperature difference of the heat transfer fluid between the inlet and the outlet of the stack as obtained remains below a limit value, or in equivalent manner that the flow rate Qf of the pump 28 is greater than some minimum flow rate. In a manner independent of the adjustment of the flow rate Qf, changes in the temperature difference of the heat transfer fluid between the inlet and the outlet of the stack can be compensated, when required, by adjusting the throat section of the ejector 14, in compliance with the second relationship. This second compensation may be performed in an open loop, i.e. without servo-control. The control performed by the electronic control unit 26 may also be performed in the opposite order, i.e. beginning by adjusting the throat section of the ejector 14 and then by adjusting the flow rate of the pump 28 so that the minimum flow rate criterion is satisfied.

If the temperature difference of the heat transfer fluid between the inlet and the outlet of the stack varies little, it is even possible to consider that it remains constant and to reduce the thermal regulation to a single-variable control law, e.g. by controlling only the flow rate of the pump 28. Under such circumstances, the passive pump member 14 could be a fixed geometry ejector.

Digital implementations performed by the inventors have shown that for a given setpoint temperature and a given thermal power given off by the fuel cell 12, it is possible to find several pairs of values for the throat section and for the flow rate of the pump 28 that satisfy the above-mentioned relationship between the four variables and that maintain the fuel cell 12 at the desired temperature under steady conditions. A particular pair of values may be selected rather than some other pair so as to minimize the temperature gradient of the heat transfer fluid along the cooling circuit 20, so as to minimize the energy consumed by the regulator system (the pump 28 requires a continuous power supply, whereas the throat section of the ejector does not consume energy once it has been modified to a desired value), or indeed to ensure that each component such as the pump 28 and the ejector 14 operates in an optimum operating zone.

It should be observed that the flow rate of the pump 28 is an intermediate variable. It is possible to control this variable indirectly by regulating the control variables to the pump 28, such as, for example, its speed, its voltage, or its current. Various ways of controlling a pump are themselves known and are not described herein.

Although the description relates to a thermal regulator system that is suitable for a fuel cell, said system can be used for thermally regulating other apparatuses or devices in which temperature is adjusted by means of a heat transfer fluid.

Although the present invention is described with reference to specific embodiments, modifications may be made to those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. A thermal regulator system for a fuel cell, the system comprising a passive pump member having a first inlet connected to a first pipe, a second inlet connected to a second pipe, and an outlet configured to be connected to a cooling circuit of the fuel cell, the passive pump member being configured to use the Venturi effect to drive a fluid flowing along the second pipe by means of a fluid flowing along the first pipe, the first pipe and the second pipe being configured to be connected to an outlet of the cooling circuit of the fuel cell, the first pipe being provided with a heat exchanger so that the first pipe and the second pipe are configured to feed the passive pump member with fluids at different temperatures.

2. The thermal regulator system according to claim 1, further comprising a buffer tank configured to be connected to said outlet of the cooling circuit of the fuel cell, the first pipe and the second pipe being connected to the buffer tank.

3. The thermal regulator system according to claim 1, wherein the passive pump member is an ejector.

4. The thermal regulator system according to claim 3, including a control unit for controlling a throat section of the ejector.

5. The thermal regulator system according to claim 1, further comprising a pump placed on the first pipe.

6. The thermal regulator system according to claim 5, including a control unit configured to control a flow rate of the pump.

7. The thermal regulator system according to claim 1, including a measurement device configured to measure a magnitude that is representative of a thermal power given by the fuel cell.

8. The thermal regulator system according to claim 4, wherein the control unit is configured to control the throat section of the ejector as a function of at least one of a temperature of the fuel cell and a temperature difference of the fluid between the inlet and the outlet of the fuel cell.

9. The thermal regulator system according to claim 1, wherein the passive pump member is a variable geometry ejector.

10. The thermal regulator system according to claim 6, wherein the control unit is configured to control the flow rate of the pump as a function of at least one of a temperature of the fuel cell and a temperature difference of the fluid between the inlet and the outlet of the fuel cell.

11. The thermal regulator system according to claim 5, wherein the first pipe is configured to convey fluid at a colder temperature than fluid conveyed by the second pipe.

12. The thermal regulator system according to claim 5, wherein the pump is positioned between the heat exchanger and the passive pump member.

13. The thermal regulator system according to claim 1, wherein the first pipe, the second pipe, and the cooling circuit are configured to convey a heat transfer fluid that remains in the liquid state at 3 bars and 200° C.

14. A fuel cell assembly comprising a fuel cell having a cooling circuit, and a thermal regulator system, the thermal regulator system comprising a passive pump member having a first inlet connected to a first pipe, a second inlet connected to a second pipe, and an outlet connected to the cooling circuit, the passive pump member being configured to use the Venturi effect to drive a fluid flowing along the second pipe by means of a fluid flowing along the first pipe, the first pipe and the second pipe being connected to an outlet of the cooling circuit, the first pipe being provided with a heat exchanger so that the first pipe and the second pipe are configured to feed the passive pump member with fluids at different temperatures.

15. The fuel cell assembly according to claim 14, wherein the outlet is connected to an inlet of the cooling circuit.

16. The fuel cell assembly according to claim 14, further comprising a buffer tank, wherein the outlet, the cooling circuit and the buffer tank are connected in series.

17. The thermal regulator system according to claim 6, wherein:
    the passive pump member is an ejector; and
    the control unit is further configured to control a throat section of the ejector.

\* \* \* \* \*